United States Patent [19]
Kates et al.

[11] Patent Number: 5,864,457
[45] Date of Patent: Jan. 26, 1999

[54] SYSTEM AND METHOD FOR CONTROLLING CURRENT FLOW IN AN AC ADAPTER

[75] Inventors: Barry K. Kates, Austin; Alan E. Brown, Georgetown, both of Tex.

[73] Assignee: Dell USA, L.P., Round Rock, Tex.

[21] Appl. No.: 786,575

[22] Filed: Jan. 21, 1997

[51] Int. Cl.$^6$ .................................................. H02H 3/22
[52] U.S. Cl. ............................................ 361/111; 361/118
[58] Field of Search .................................... 361/118, 111, 361/110, 91, 58, 18, 87, 93, 94, 98; 323/265, 273, 274, 276, 281, 284, 285, 286; 363/45, 50, 52, 53, 74, 76, 78, 80, 21; 364/483

[56] References Cited

U.S. PATENT DOCUMENTS

| | | | |
|---|---|---|---|
| 4,146,832 | 3/1979 | McConnell | 323/17 |
| 5,010,293 | 4/1991 | Ellersick | 323/278 |
| 5,055,991 | 10/1991 | Carroll et al. | 363/56 |
| 5,140,511 | 8/1992 | Lee et al. | 363/21 |
| 5,257,156 | 10/1993 | Kirkpatrick | 361/18 |
| 5,272,584 | 12/1993 | Austruy et al. | 361/58 |
| 5,297,014 | 3/1994 | Saito et al. | 363/21 |
| 5,355,077 | 10/1994 | Kates | 323/224 |
| 5,430,641 | 7/1995 | Kates | 363/133 |
| 5,587,685 | 12/1996 | Johansson | 327/546 |

*Primary Examiner*—Jeffrey Gaffin
*Assistant Examiner*—Michael J. Sherry

*Attorney, Agent, or Firm*—Skjerven, Morrill, MacPherson, Franklin & Friel, L.L.P.; Ken J. Koestner

[57] ABSTRACT

A surge modification circuit controls surge current flows which may occur when a computer and AC adapter are connected. The surge current flows are controlled using active circuitry since passive circuitry, which is in place continuously, sustains large uninterrupted heating power losses in the order of watts that are wasted over time. In one embodiment, a surge modification circuit in an AC adapter includes a control element that operates as a power analog switch with a slow transition time to reduce the steepness of a surge wavefront resulting from the connection of the output terminals of the AC adapter to a computer while the AC adapter is energized. In a second embodiment, a surge modification circuit in an AC adapter employs a pair of power converter control circuits including a main power converter control circuit for performing the power conversion and a sensing power converter control circuit for determining whether the AC Adapter is connected to a computer and informing the main power converter control circuit of the connection status so that the main power converter is disabled when the computer is not attached. In some embodiments, an optoelectronic coupler is advantageously used to communicate a message indicative of the status of a connection between the AC Adapter and the computer. The optoelectronic coupler transfers the status message using optical isolation to maintain a barrier of isolation supplied by the transformer between the computer, mutually isolating AC and DC power.

21 Claims, 4 Drawing Sheets

SYSTEM AND METHOD FOR CONTROLLING CURRENT FLOW IN AN AC ADAPTER

BACKGROUND OF THE INVENTION

1. Field of the Invention

The present invention relates to power supply circuits. More specifically, the present invention relates to power supply circuits and associated operating methods for controlling current flow in an AC adapter.

2. Description of the Related Art

Computers such as laptop computers are powered by an AC power source or, if AC power is not available, an installed rechargeable battery. To ensure that a user of a computer has sufficient battery charge available when AC power is only intermittently available and available for a short time, developers and manufacturers of AC adapters, charging circuits and rechargeable batteries have developed battery charging systems and rechargeable batteries that restore charge to the batteries very quickly. The fast charging character of these systems and batteries is achieved by adapting the AC adapter, the charging circuits and the battery to greatly increase the amount of power that is applied to the battery. Present-day AC adapters have increased in power to the range of 65 to 100 watts.

Unfortunately, the large increase in power in charging circuits and AC adapters results in a substantial electrical stress to the power control system. First, a large current surge to the AC adapter occurs when the adapter is connected to AC power lines. Second, a large current surge takes place when the AC adapter is connected to the computer. Peak current surges in excess of 50 amperes have been measured. Peak current surges of this magnitude can be highly destructive to bulk capacitors both in the computer and in the AC adapter. In addition, peripheral system interconnect components are stressed due to inductive coupling of energy between the AC adapter cabling and the interconnect components.

SUMMARY OF THE INVENTION

What is needed is a system and method for reducing high surge currents that may occur upon connecting a computer such as a laptop or computer to an AC adapter. What is further needed is a system and method for altering the waveshape of surges that may occur in the charging system of a computer to protect the charging circuits, AC adapter and computer. What is needed is a charge modifier for the power-supplying circuits of a computer that reduces the steepness of a surge wavefront that results from the connection of an AC adapter to an AC supply line and results from the connection of the AC adapter to a computer.

In accordance with an embodiment of the present invention, a surge modification circuit controls surge current flows which may occur when a computer and AC adapter are connected. The surge current flows are controlled using active circuitry since passive circuitry, which is in place continuously, sustains large uninterrupted heating power losses in the order of watts that are wasted over time. The usage of active circuits is also advantageous since passive circuitry is physically larger than active circuitry.

In accordance with an embodiment of the present invention, a surge modification circuit in an AC adapter includes a control element that operates as a power analog switch with a slow transition time to reduce the steepness of a surge wavefront resulting from the connection of the output terminals of the AC adapter to a computer while the AC adapter is energized.

In accordance with an additional embodiment of the present invention, a surge modification circuit in an AC adapter employs a pair of power converter control circuits including a main power converter control circuit for performing the power conversion and a sensing power converter control circuit for determining whether the AC Adapter is connected to a computer and informing the main power converter control circuit of the connection status so that the main power converter is disabled when the computer is not attached.

Many advantages are achieved by the described surge modification system and operating method. The surge modification system advantageously reduces high surge currents that occur when a computer such as a laptop, notebook or computer is connected to an AC power line. It is advantageous that the charge modifier for the power-supplying circuits of a computer substantially reduces the steepness of a surge wavefront resulting from the connection of the DC output terminal of the AC adapter to a computer while the adapter is energized.

In some embodiments, an optoelectronic coupler is advantageously used to communicate a message indicative of the status of a connection between the AC Adapter and the computer. The optoelectronic coupler transfers the status message using optical isolation to maintain a barrier of isolation supplied by the transformer between the computer, mutually isolating AC and DC power.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings. The use of the same reference symbols in different drawings indicates similar or identical items.

DESCRIPTION OF THE ILLUSTRATIVE EMBODIMENT(S)

Figure 1:
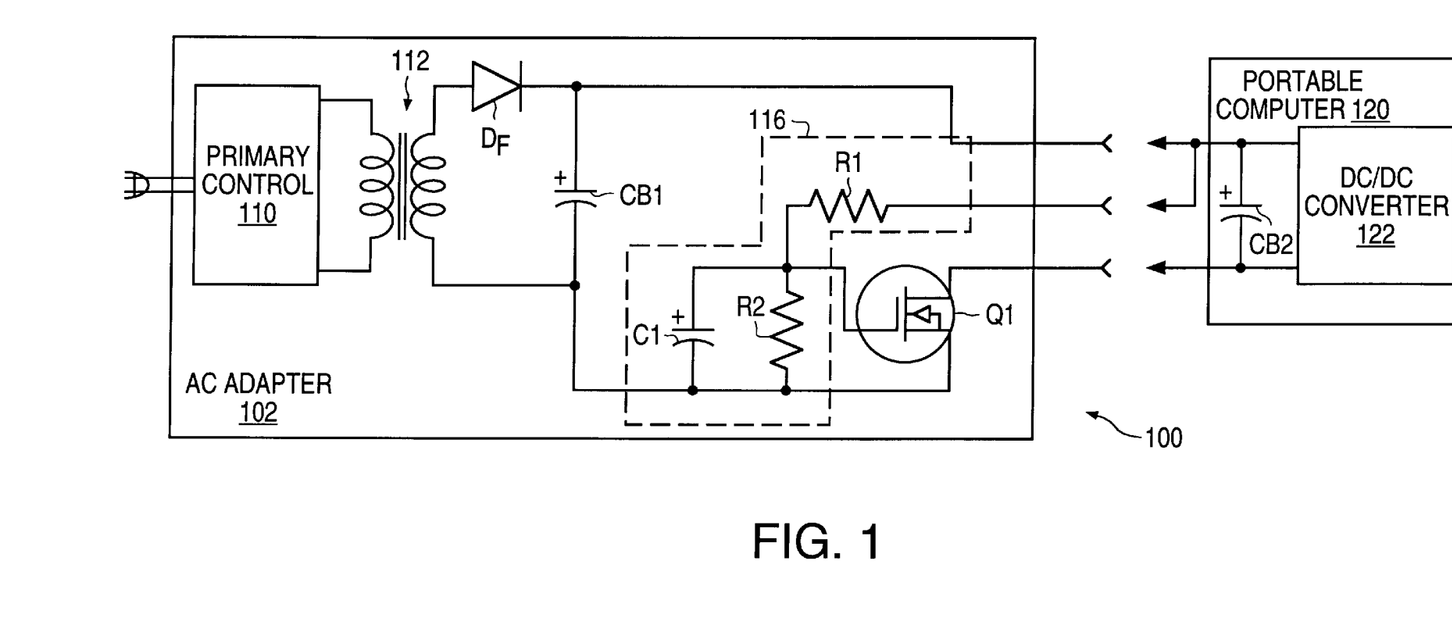
FIG. 1 is a schematic block diagram illustrating a first embodiment of a surge protection circuit which employs a control element operating as a power analog switch with a slow transition time to control the steepness of a surge wavefront.

Referring to FIG. 1, a first embodiment of a surge protection circuit 100 is shown which employs a control element operating as a power analog switch with a slow transition time to control the steepness of a surge wavefront. The illustrative surge protection circuit 100 includes an AC Adapter 102 and a computer 120. The AC Adapter 102 and the computer 120 are connected for supplying operating power and charging an internal rechargeable battery (not shown) in the computer 120 at three input terminals including a first positive terminal, a second positive terminal connected at the computer 120 to the first positive terminal, and a negative terminal. The AC Adapter 102 and the computer 120 are disconnected for portable, battery-powered usage of the computer 120.

The AC Adapter 102 includes a primary control circuit 110, a transformer 112, and a power switch filter 116.

The primary control circuit 110 is connected to the primary winding of a transformer 112. A bulk capacitance $C_{B1}$ is formed between positive and negative terminals of the secondary winding of the transformer 112. The bulk capacitance $C_{B1}$ increases the output voltage of the transformer 112 and decreases the voltage ripple. The output voltage and the amount of filtering are set by the value of the bulk capacitance $C_{B1}$ in relation to the load current. The positive terminal of the secondary winding is connected to the first positive terminal of the computer 120 when the computer 120 is connected to the AC Adapter 102. The negative terminal of the secondary winding is connected to the power switch filter 116.

An N-channel power MOSFET Q1 controls the rate of change of current during a surge by reacting to a surge with a slow current flow transition. The power switch filter 116 is connected to the N-channel power MOSFET Q1 to set the rate of current change. The power switch filter 116 includes a capacitor C1 and a resistor R2 connected in parallel between the gate terminal and the source terminal of the N-channel power MOSFET Q1. The drain terminal of the N-channel power MOSFET Q1 is connected to the negative terminal of the computer 120 when the computer 120 and the AC Adapter 102 are connected. The power switch filter 116 also includes a resistor R1 connected between the gate terminal of the N-channel power MOSFET Q1 and the second positive terminal of the computer 120 when the computer 120 is connected to the AC Adapter 102.

The N-channel power MOSFET Q1 reduces the steep current changes under current surge conditions by reacting to the surge with a slow current flow transition. The speed of the transition is controlled by the charge rate of the capacitor C1 with respect to the transfer characteristics of the N-channel power MOSFET Q1. The capacitance of the capacitor C1, in combination with the resistances of the resistor R1 and the resistor R2, are selected to effectively program both the onset and the decay of a current surge.

The illustrative AC Adapter 102 continues to convert AC power to DC power even when the computer 120 is not connected to the AC Adapter 102, thus wasting some amount of power.

Figure 2:
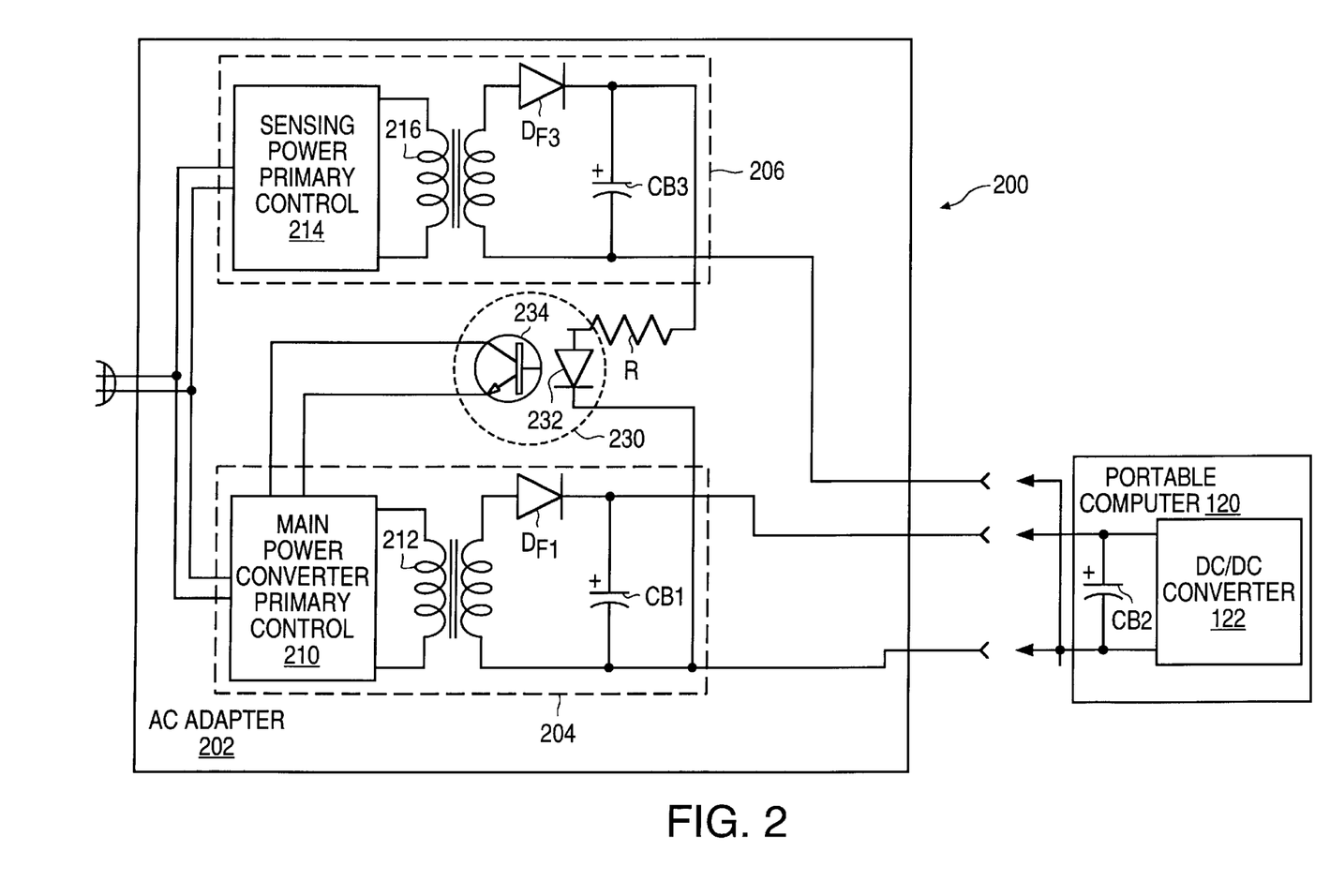
FIG. 2 is a schematic block diagram showing a second embodiment of a surge protection circuit utilizing a pair of power converter control circuits including a main power converter control circuit for performing the power conversion and a sensing power converter control circuit for determining whether an AC Adapter is connected to a computer.

Referring to FIG. 2, a second embodiment of a surge protection circuit 200 is shown which employs a pair of power converter control circuits including a main power converter control circuit 204 for performing the power conversion and a sensing or auxiliary power converter control circuit 206 for determining whether an AC Adapter 202 is connected to a computer 120. The sensing power converter control circuit 206 informs the main power converter control circuit 204 whether the computer 120 is connected to disable the main power converter control circuit 204 when the computer 120 is not connected. The illustrative surge protection circuit 200 includes the AC Adapter 202 and the computer 120. The AC Adapter 202 and the computer 120 are connected for supplying operating power and charging an internal rechargeable battery (not shown) in the computer 120 at three input terminals including a first positive terminal, a second positive terminal connected at the computer 120 to the first positive terminal, and a negative terminal. The AC Adapter 202 and the computer 120 are disconnected for portable, battery-powered usage of the computer 120.

The AC Adapter 202 includes the main power converter control circuit 204 and the sensing power converter control circuit 206 with a signal coupler 230 communicating a status signal indicative of the status of the connection between the AC Adapter 202 and the computer 120 from a secondary winding of the sensing power converter control circuit 206 to the primary winding of the main power converter control circuit 204.

The main power converter control circuit 204 includes a main power converter primary control circuit 210 and a transformer 212. The main power converter primary control circuit 210 is connected to the primary winding of the transformer 212 with the bulk capacitance $C_{B1}$ formed between positive and negative terminals of the secondary winding of the transformer 212 to increase the output voltage and decrease voltage ripple. The bulk capacitance $C_{B1}$ value sets the output voltage and the amount of filtering. The positive terminal of the secondary winding is connected to the second positive terminal of the computer 120 when the computer 120 is connected to the AC Adapter 102. The negative terminal of the secondary winding is connected to the negative terminal of the computer 120 when the AC Adapter 202 and the computer 120 are connected.

The sensing or auxiliary power converter control circuit 206 includes a sensing or auxiliary power converter primary control circuit 214 and a transformer 216. The sensing power converter control circuit 206 has a much reduced power consumption in comparison to the main power converter control circuit 204 and is used simply to determine whether the AC Adapter 202 is connected to the computer 120, allowing the main power converter control circuit 204 to be totally disabled when the AC Adapter 202 and computer 120 are disconnected. Upon connection of the computer 120 to the AC Adapter 202, the main power converter primary control circuit 210 governs a slow rampup of the main power converter control circuit 204.

The sensing power converter primary control circuit 214 is connected to the primary winding of the transformer 216. A bulk capacitance $C_{B3}$ formed between positive and negative terminals of the secondary winding of the transformer 216 increases the output voltage and decreases the voltage ripple. The bulk capacitance $C_{B3}$ value sets the output voltage and the amount of filtering. The positive terminal of the secondary winding is connected to a signal coupler 230 through a resistor $R_1$, and then connected to the negative terminal of the computer 120 when the computer 120 is connected to the AC Adapter 102. The signal coupler 230, illustratively an optocoupler including a photodiode 232 and a phototransistor 234, is connected to the main power converter control circuit 204 to control the power conversion process. In alternative embodiments, other types of isolating signal couplers such as inductive couplers may be used to communicate a status signal of the computer-AC Adapter connector.

In the illustrative embodiment, the signal coupler 230 is an optoelectronic coupler to advantageously control the primary winding of the main power converter control circuit 204 from the secondary winding of the sensing power converter control circuit 206. The optoelectronic signal coupler 230 transfers the status message using optical isolation to maintain a barrier of isolation supplied by the transformer 212 between the AC power line and the computer 120, mutually isolating AC power from the DC power which energizes the computer 120. The negative terminal of the secondary winding is connected to the first positive terminal of the computer 120 when the computer 120 is connected to the AC Adapter 202.

The sensing power converter control circuit 206 operates in combination with the main power converter control circuit 204. The signal coupler 230 transfers a status signal indicative of whether the AC Adapter 202 is connected to the computer 120 from the secondary winding of the sensing power converter primary control circuit 214 to the main power converter control circuit 204. Once the computer 120 is connected to the AC Adapter 202, the Dower conversion level of the main power converter control circuit 204 is slowly increased. When the computer 120 is disconnected from the AC Adapter 202, the main power converter control circuit 204 is completely disabled, inhibiting an excessive flow of current when the computer 120 is next connected to the AC Adapter 202. The sensing power converter control circuit 206 has a power consumption of only a few milliwatts, for example 10 milliwatts or less, so that the amount of power consumed by the AC Adapter 202 when the computer 120 is disconnected is reduced to an insignificant level.

Figure 3:
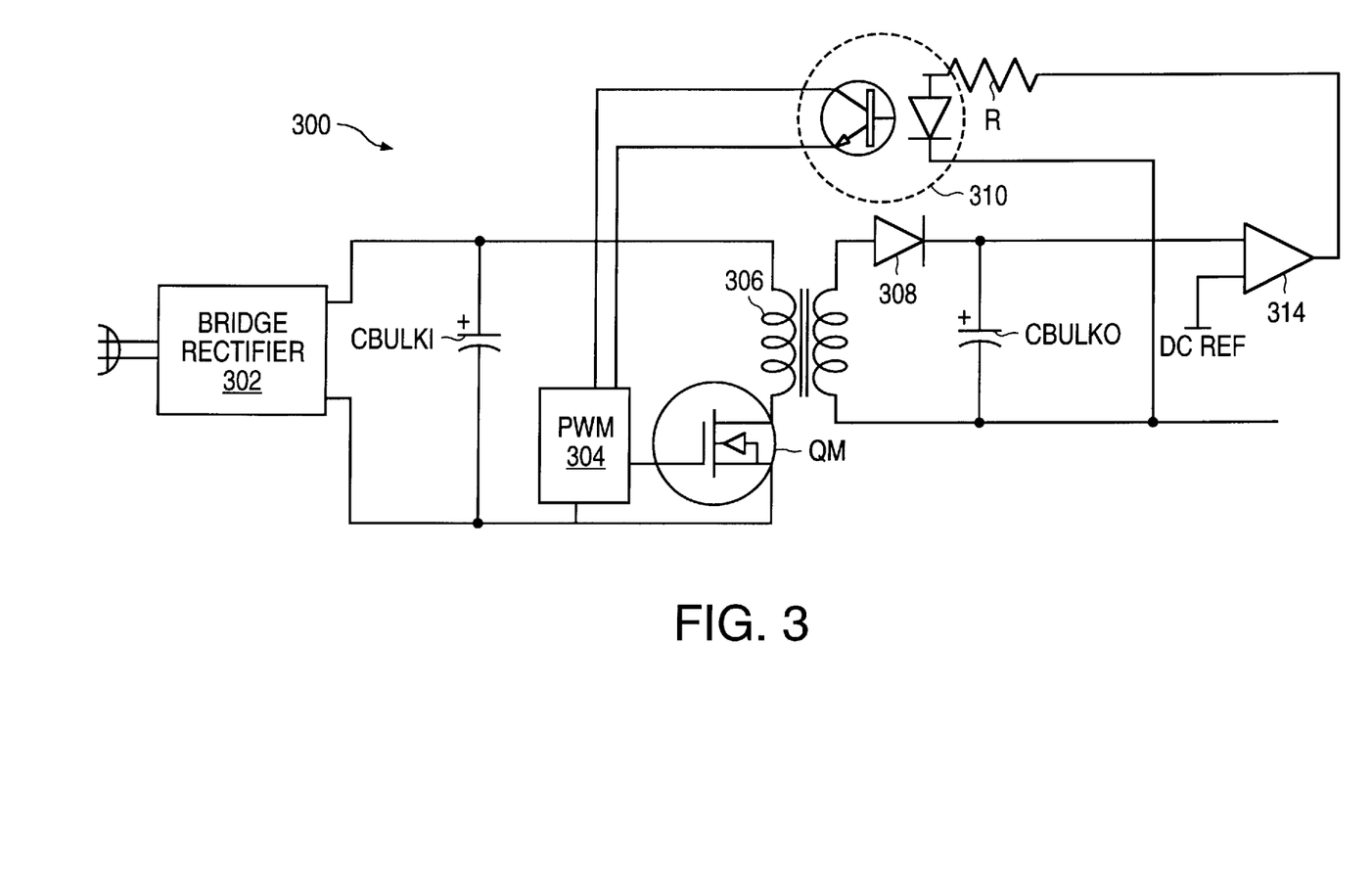
FIG. 3 is a schematic block diagram illustrating an embodiment of a power factor controller for usage in a surge protection circuit.

Referring to FIG. 3, a schematic block diagram illustrates an embodiment of a power converter control circuit 300. The power converter control circuit 300 performs active power correction for power systems that otherwise draw nonsinusoidal current from sinusoidal power lines. The power converter control circuit 300 includes an AC input terminal 312 connected to a bridge rectifier 302 having a first output terminal connected to a input bulk capacitor $C_{BULK1}$. A transformer 306 has a primary winding with a first terminal connected to a positive output terminal of the bridge rectifier 302. A MOSFET $Q_M$ has a source-drain pathway connected from a second terminal of the primary winding of the transformer 306 to a second output terminal of the bridge rectifier 302. The MOSFET $Q_M$ has a control terminal that is driven by a pulse width modulator 304. The transformer 306 has a secondary winding with a first terminal that is connected to a diode 308. An output bulk capacitor $C_{BULK0}$ is connected from the diode 308 to a second terminal of the transformer 306 secondary winding. The pulse width modulator 304 receives a control signal from the optocoupler 310 and has a ground connection to the second output terminal of the bridge rectifier 302. The control signal from the optocoupler 310 typically arises from the secondary side of the transformer 306. The control signal is typically generated by an error amplifier 314 that measures the difference between the generated DC voltage and a reference DC voltage.

The bridge rectifier 302 generates a large voltage on the input bulk capacitor $C_{BULK1}$ which is chopped by the MOSFET $Q_M$ under control of the error signal from the optocoupler 310 via the pulse width modulator 304.

In the illustrative embodiment, the pulse width modulator 304 also receives a control signal from an external source EXT. The external source EXT is supplied from the sensing power converter control circuit 206 based on whether the AC Adapter is connected to the computer.

Figure 4:
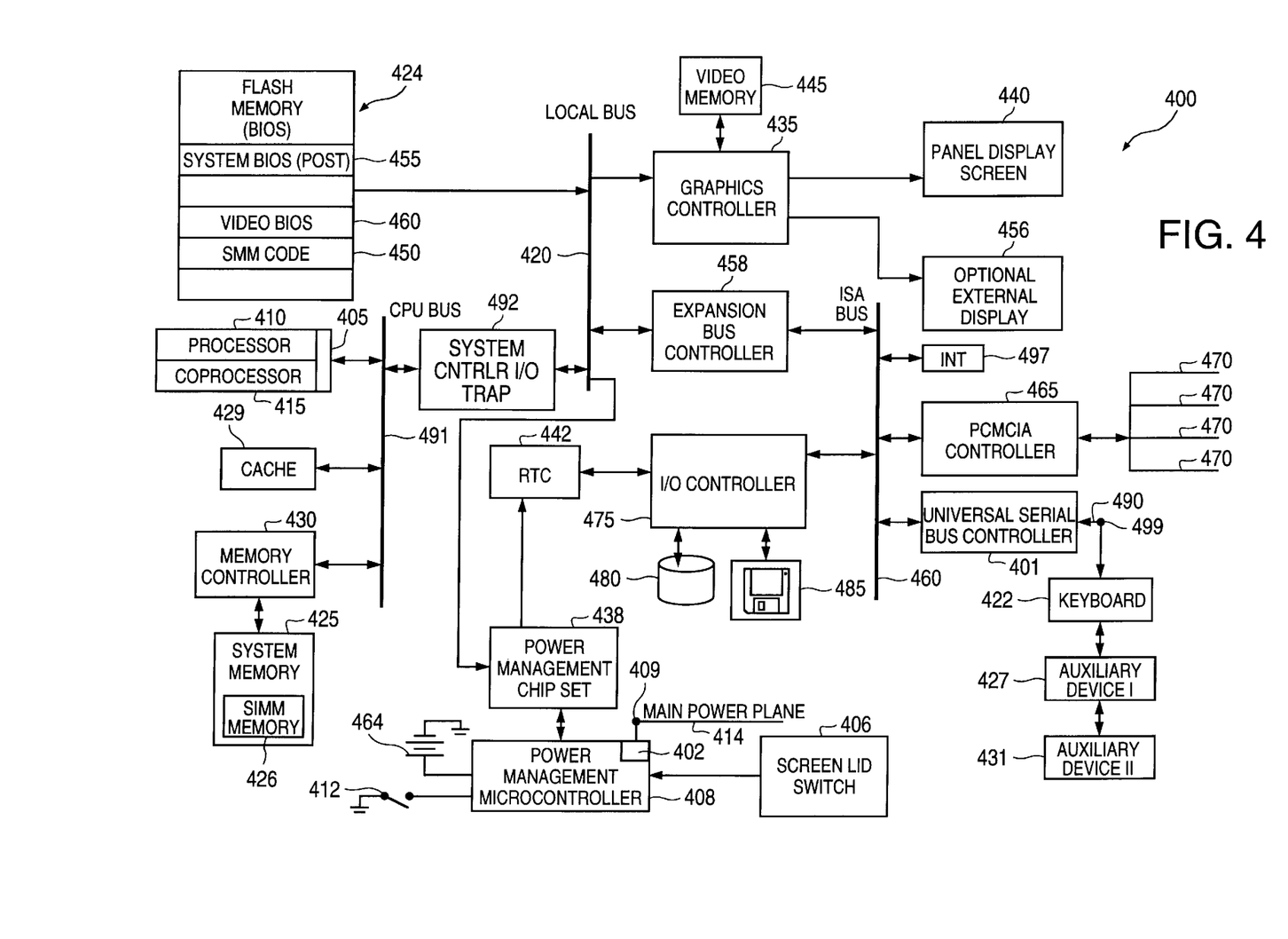
FIG. 4 is a schematic block diagram illustrating a computer system including a circuit for controlling current flow in an AC adapter.

Referring to FIG. 4, a schematic block diagram illustrates a computer system 400 including a circuit 402 for controlling current flow in an AC adapter. The computer system 400 includes a microprocessor 405 which may also be called a CPU. In some embodiments, the microprocessor 405 is, for example, an Intel™ Pentium class microprocessor or Intel™ 80486 class microprocessor. The microprocessor 405 has a processor 410 for calculating integer operations and a coprocessor 415 for calculating floating point operations. Microprocessor 405 is connected to a cache 429 and a memory controller 430 via a CPU bus 491. The cache 429 may include both a primary cache (not shown) and a secondary cache (not shown).

A system controller I/O trap circuit 492 connects the CPU bus 491 to a local bus 420. The system controller I/O trap circuit 492 is generally characterized as part of a system controller such as a Pico Power Vesuvious or an Intel™ Mobile Triton chip set. In some embodiments, the system controller I/O trap circuit 492 is programmed to intercept a particular target address or address range. Upon intercepting a target address, the system controller I/O trap circuit 492 asserts an intercept signal indicating that the microprocessor 405 has attempted to access the target address.

In the some embodiments, the intercept signal is connected to an SMI ("system management interrupt") pin of the microprocessor 405, causing the microprocessor 405 to enter system management mode ("SMM").

A main memory 425, typically assembled from a plurality of dynamic random access memory ("DRAM") modules, is connected to the local bus 420 by a memory controller 430. The main memory 425 includes a system management mode memory area which is employed to store converter code to implement conversion methodology embodiments as will be discussed in more detail subsequently.

A Basic Input Output System ("BIOS") memory 424 is connected to local bus 420. A FLASH memory or other nonvolatile memory is used as BIOS memory 424. BIOS memory 424 stores the system code which controls some operations of the computer system 400.

A graphics controller 435 is connected to the local bus 420 and to a panel display screen 440. The graphics controller 435 is also connected to a video memory 445 which stores information to be displayed on panel display 440. The panel display 440 is typically an active matrix or passive matrix liquid crystal display ("LCD") although other display technologies may be used as well. Graphics controller 435 is optionally connected to an optional external display or standalone monitor display 456. One example of a suitable graphics controller for usage as the graphics controller 435 is the Western Digital WD90C24A graphics controller.

A bus interface controller or expansion bus controller 458 connects the local bus 420 to an expansion bus 460. In the illustrative embodiment, expansion bus 460 is an Industry Standard Architecture ("ISA") bus although other buses, for example, a Peripheral Component Interconnect ("PCI") bus, may otherwise be used. A PCMCIA ("Personal Computer Memory Card International Association") controller 465 is connected to expansion bus 460. The PCMCIA controller 465 is connected to a plurality of expansion slots 470 to receive PCMCIA expansion cards such as modems, fax cards, communications cards, and other input/output devices. An interrupt request generator 497 is also connected to the ISA bus 460 and issues an interrupt service request over a predetermined interrupt request line after receiving a request signal from the processor 405 requesting issuance of an interrupt.

An I/O controller 475 is connected to ISA bus 460. The I/O controller 475 is interfaced to both an integrated drive electronics ("IDE") hard drive 480 and a floppy diskette drive 485.

A USB controller 401 transfers data to and from the processor 410 via the ISA bus 460. A keyboard 422, auxiliary device I, and auxiliary device II are connected serially to a USB connector 499. This interconnection topology is implemented according the USB technology standard. External devices which include keyboard 422, auxiliary device I, and auxiliary device II communicate with microprocessor 405 via the USB controller 401. Auxiliary devices are typically communication devices such as a mouse, a modem, a joystick, or another computer system. When USB controller 401 receives data from the connected external devices, USB controller 401 issues an interrupt request to the microprocessor 405. The microprocessor 405 interprets the interrupt request as a request for service from a conventional communication interface and attempts to process the interrupt request accordingly. However, a USB servicing routine is executed instead.

The computer system 400 includes a power supply 464, such as a battery, which supplies operating power to the many devices of the computer system 400. The power supply 464 in the computer system 400 is a rechargeable battery, such as a nickel metal hydride ("NiMH") or lithium ion battery. The power supply 464 is connected to a power management microcontroller 408 which operates in the manner of an AC line adapter and controls the distribution of power from power supply 464. More specifically, the power control microcontroller 408 includes a power output terminal 409 connected to a main power plane 414 which supplies power to microprocessor 405. The power management microcontroller 408 is also connected to a power plane (not shown) supplying operating power to panel display 440. In the illustrative embodiment, the power control microcontroller 408 is a Motorola 6805 microcontroller. The power control microcontroller 408 monitors the charge level of the power supply 464 to determine when to charge a battery 464 and when to deny a charging voltage to the battery 464. The power control microcontroller 408 is connected to a main power switch 412 which the user actuates to turn on or shut off the computer system 400. While the power control microcontroller 408 powers down other portions of the computer system 400 such as hard drive 480 when not in use to conserve power, the power control microcontroller 408 itself is always connected to a source of energy, namely power supply 464.

The computer system 400 also includes a screen lid switch 406 or indicator for indicating when the panel display 440 is in the open or closed positions. The panel display 440 is generally located in the typical lid location for "clamshell" types of computers such as laptop or notebook computers. The panel display 440 forms an integral part of the lid of the computer and is set in either an open position with the screen accessible for usage or a closed condition for storage and porting.

The computer system 400 also includes a power management chip set 438 which includes power management chip models PT86C521 and PT86C22 manufactured by Pico Power. The power management chip set 438 is connected to microprocessor 405 via local bus 420 so that the power management chip set 438 receives power control commands from microprocessor 405. The power management chip set 438 is connected to a plurality of individual power planes supplying power to respective devices in the computer system 400 such as the hard drive 480 and floppy diskette drive 485, for example. The power management chip set 438 operates under control of the microprocessor 405 to control the power to the various power planes and devices of the computer. A real time clock ("RTC") 440 is connected to the I/O controller 475 and the power management chip set 438 so that time events or alarms are transmitted to the power management chip set 438. The real time clock 440 is typically programmed to generate an alarm signal at a predetermined time.

When the computer system 400 is turned on or powered up, the system BIOS software stored in non-volatile BIOS memory 424 is copied into main memory 425 to execute instructions more quickly in a technique called "shadowing" or "shadow RAM". At this time, an SMM program code 450 is also copied into the system management mode memory area 426 of main memory 425. The microprocessor 405 executes SMM code 450 after the microprocessor 405 receives a system management interrupt ("SMI") which causes the microprocessor to enter system management mode (SMM) operation. In addition to the SMM code 450, a video BIOS 462 and a system BIOS program code 455 including a power-on self-test (POST) module are stored in the BIOS memory 424 and copied into main memory 425 at power-up. Alternative memory mapping schemes may also be used. For example, SMM code 450 may be stored in fast SRAM memory (not shown) connected to the local/CPU bus 420.

While the invention has been described with reference to various embodiments, it will be understood that these embodiments are illustrative and that the scope of the invention is not limited to them. Many variations, modifications, additions and improvements of the embodiments described are possible. For example, although the surge protection circuits 100 and 200 illustratively employ a transformer in other embodiments other types of transformer circuits may be used, such as a single-phase half-wave rectifier, a single-phase bridge rectifier, a single-phase center tap rectifier, a Wye (three-phase star) rectifier, a three-phase bridge rectifier, a six-phase star rectifier, a three-phase double Wye with an interphase transformer, and the like. The computer 120 is broadly defined as any types of computers known in the art including portable, desktop, laptop, palm-held computers, and the like. A computer 120 definition includes other types of computing equipment that may not ordinarily be called a computer such as a workstation, ATM machine, and other types of systems that include a computing capability.

What is claimed is:

1. A surge protection apparatus comprising:
   an AC adapter having an input terminal for coupling to an AC line and an output terminal for coupling to a computer, the AC adapter including:
   a main AC adapter circuit including:
      a main primary control circuit; and
      a main transformer coupled to the main primary control circuit; and
   an active control device coupled to the AC adapter for reducing high surge currents that may occur upon connecting a computer to the AC adapter, the active control device including:
   a sensing AC adapter circuit including:
      a sensing primary control circuit; and
      a sensing transformer coupled to the sensing primary control circuit; and
   a coupler for coupling a sensed power condition signal from the sensing AC adapter circuit to the main AC adapter circuit.

2. A surge protection apparatus according to claim 1 wherein:
   the main transformer has a primary winding and a secondary winding, the primary winding having a first end and a second end, the secondary winding having a first end and a second end;

a diode is coupled to the first end of the secondary winding;

a bulk capacitance is coupled from the diode to the second end of the secondary winding; and the main primary control circuit is coupled from the first end to the second end of the primary winding of the main transformer.

3. A surge protection apparatus according to claim 1 wherein:

the sensing transformer has a primary winding and a secondary winding, the primary winding having a first end and a second end, the secondary winding having a first end and a second end;

a diode is coupled to the first end of the secondary winding;

a bulk capacitance is coupled from the diode to the second end of the secondary winding; and the primary control circuit is coupled from the first end to the second end of the primary winding of the sensing transformer.

4. A surge protection apparatus according to claim 1 wherein:

the coupler is an optoelectronic coupler for coupling a sensed signal at an output terminal of the sensing AC adapter circuit to a control terminal of the main AC adapter circuit for controlling the main primary control circuit with injection of negligible electrical noise.

5. The surge protection apparatus of claim 1 wherein:

the coupler provides the sensed power condition signal to the main primary control circuit.

6. The surge protection apparatus of claim 1 wherein:

the power condition signal indicates whether the AC adapter is connected to a computer;

the main primary control circuit having a power conversion level;

the power conversion level is increased to an operating level in response to the power condition signal indicating that the AC adapter is connected to a computer.

7. The surge protection apparatus of claim 1 wherein:

the power condition signal indicates whether the AC adapter is connected to a computer;

the main primary control circuit is disabled in response to the power condition signal indicating that the AC adapter is not connected to a computer.

8. A surge protection apparatus comprising:

an AC adapter having an input terminal for coupling to an AC line and an output terminal for coupling to a computer, the AC adapter including:

a main AC adapter circuit including:

a main primary control circuit; and a main transformer coupled to the main primary control circuit;

an active control device coupled to the AC adapter for reducing high surge currents that may occur upon connecting a computer to the AC adapter, the active control device including:

a sensing AC adapter circuit including:

a sensing primary control circuit; and a sensing transformer coupled to the sensing primary control circuit;

a coupler for coupling a sensed power condition signal from the sensing AC adapter circuit to the main AC adapter circuit.

9. A surge protection apparatus according to claim 8 wherein:

the main transformer has a primary winding and a secondary winding, the primary winding having a first end and a second end, the secondary winding having a first end and a second end;

a diode is coupled to the first end of the secondary winding;

a bulk capacitance is coupled from the diode to the second end of the secondary winding; and the main primary control circuit is coupled from the first end to the second end of the primary winding of the main transformer.

10. A surge protection apparatus according to claim 8 wherein:

the sensing transformer has a primary winding and a secondary winding, the primary winding having a first end and a second end, the secondary winding having a first end and a second end;

a diode is coupled to the first end of the secondary winding;

a bulk capacitance is coupled from the diode to the second end of the secondary winding; and the primary control circuit is coupled from the first end to the second end of the primary winding of the sensing transformer.

11. A surge protection apparatus according to claim 10 wherein:

the coupler is an optoelectronic coupler for coupling a sensed signal at an output terminal of the sensing AC adapter circuit to a control terminal of the main AC adapter circuit for controlling the main primary control circuit with injection of negligible electrical noise.

12. The surge protection apparatus of claim 8 wherein:

the coupler provides the sensed power condition signal to the main primary control circuit.

13. The surge protection apparatus of claim 8 wherein:

the power condition signal indicates whether the AC adapter is connected to a computer;

the main primary control circuit having a power conversion level;

the power conversion level is increased to an operating level in response to the power condition signal indicating that the AC adapter is connected to a computer.

14. The surge protection apparatus of claim 8 wherein:

the power condition signal indicates whether the AC adapter is connected to a computer;

the main primary control circuit is disabled in response to the power condition signal indicating that the AC adapter is not connected to a computer.

15. A computer system comprising:

a computer; and a surge protection apparatus for electrical connection to the computer including:

an AC adapter having an input terminal for coupling to an AC line and an output terminal for coupling to a computer, the AC adapter including:

a main AC adapter circuit including:

a main primary control circuit; and a main transformer coupled to the primary control circuit; and an active control device coupled to the AC adapter for reducing high surge currents that may occur upon connecting a computer to the AC adapter, the active control device including:

a sensing AC adapter circuit including:
   a sensing primary control circuit; and
   a sensing transformer coupled to the primary control circuit; and
a coupler for coupling a sensed power condition signal from the sensing AC adapter circuit to the main AC adapter circuit.

16. A computer system according to claim 15 wherein:

the main transformer has a primary winding and a secondary winding, the primary winding having a first end and a second end, the secondary winding having a first end and a second end;

a diode is coupled to the first end of the secondary winding;

a bulk capacitance is coupled from the diode to the second end of the secondary winding; and the main primary control circuit is coupled from the first end to the second end of the primary winding of the main transformer.

17. A computer system according to claim 15 wherein:

the sensing transformer has a primary winding and a secondary winding, the primary winding having a first end and a second end, the secondary winding having a first end and a second end;

a diode is coupled to the first end of the secondary winding;

a bulk capacitance is coupled from the diode to the second end of the secondary winding; and the primary control circuit is coupled from the first end to the second end of the primary winding of the sensing transformer.

18. A computer system according to claim 15 wherein:

the coupler is an optoelectronic coupler for coupling a sensed signal at an output terminal of the sensing AC adapter circuit to a control terminal of the main AC adapter circuit for controlling the main primary control circuit with injection of negligible electrical noise.

19. The computer system of claim 15 wherein:

the coupler provides the sensed power condition signal to the main primary control circuit.

20. The computer system of claim 15 wherein:

the power condition signal indicates whether the AC adapter is connected to the computer;

the main primary control circuit having a power conversion level;

the power conversion level is increased to an operating level in response to the power condition signal indicating that the AC adapter is connected to the computer.

21. The computer system of claim 15 wherein:

the power condition signal indicates whether the AC adapter is connected to the computer;

the main primary control circuit is disabled in response to the power condition signal indicating that the AC adapter is not connected to the computer.

* * * * *